(12) United States Patent
Taniguchi et al.

(10) Patent No.: US 11,009,781 B2
(45) Date of Patent: May 18, 2021

(54) DISPLAY SYSTEM, CONTROL DEVICE, CONTROL METHOD, NON-TRANSITORY COMPUTER-READABLE MEDIUM, AND MOVABLE OBJECT

(71) Applicant: PANASONIC INTELLECTUAL PROPERTY MANAGEMENT CO., LTD., Osaka (JP)

(72) Inventors: Koji Taniguchi, Fukuoka (JP); Hiroaki Okayama, Nara (JP); Satoshi Kuzuhara, Osaka (JP); Yusuke Nihei, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 210 days.

(21) Appl. No.: 16/363,628

(22) Filed: Mar. 25, 2019

(65) Prior Publication Data

US 2019/0302583 A1 Oct. 3, 2019

(30) Foreign Application Priority Data

Mar. 29, 2018 (JP) .............................. JP2018-063909

(51) Int. Cl.
*G03B 21/14* (2006.01)
*G03B 21/28* (2006.01)
(Continued)

(52) U.S. Cl.
CPC ....... *G03B 21/142* (2013.01); *G02B 27/0101* (2013.01); *G02B 27/0179* (2013.01);
(Continued)

(58) Field of Classification Search
CPC ................ G02B 27/01; G02B 27/0101; G02B 27/0179; G02B 2027/0112;
(Continued)

(56) References Cited

U.S. PATENT DOCUMENTS 10,606,075 B2 * 3/2020 Choi .................. G02B 27/0101
2016/0216521 A1 * 7/2016 Yachida ............. G02B 27/0179
(Continued)

FOREIGN PATENT DOCUMENTS

JP   H03-88928 U    9/1991
JP   06-087043     12/1994
(Continued)

OTHER PUBLICATIONS

Notice of Refusal dated Oct. 23, 2019 issued in Japanese Patent Application No. 2018-063909 along with English translation.

*Primary Examiner* — William C. Dowling
(74) *Attorney, Agent, or Firm* — Greenblum & Bernstein, P.L.C.

(57) ABSTRACT

A display system includes an image producing unit, a projection unit and an adjustment unit. The image producing unit has a display surface, and is configured to produce an image on the display surface. The projection unit is configured to project a virtual image to a target space with an output light of the image producing unit. The virtual image corresponds to the image produced by the image producing unit. The display system is configured to change a visual distance between an eye-box and the virtual image. The adjustment unit is configured to adjust brightness of the virtual image according to the visual distance.

19 Claims, 7 Drawing Sheets

(51) Int. Cl.
  *G02F 1/1335* (2006.01)
  *G06F 9/30* (2018.01)
  *H04N 9/77* (2006.01)
  *G02B 27/01* (2006.01)
  *G02F 1/13357* (2006.01)

(52) U.S. Cl.
  CPC ..... *G02F 1/133602* (2013.01); *G03B 21/145* (2013.01); *G03B 21/28* (2013.01); *G06F 9/3004* (2013.01); *H04N 9/77* (2013.01); *G02B 2027/0185* (2013.01)

(58) Field of Classification Search
  CPC ...... G02B 2027/014; G02B 2027/0185; G02B 27/283; G02B 2027/0178; G02B 9/00671; G03B 21/14; G03B 21/142; G03B 21/2053; H04N 9/31; H04N 9/77
  USPC .......................................................... 353/20
  See application file for complete search history.

(56) References Cited

U.S. PATENT DOCUMENTS

| | | | |
|---|---|---|---|
| 2017/0176744 A1* | 6/2017 | El-Ghoroury | G02B 5/10 |
| 2017/0336628 A1* | 11/2017 | Kim | G02B 5/30 |
| 2019/0235290 A1* | 8/2019 | Nakayama | G02F 1/13 |
| 2020/0026075 A1* | 1/2020 | Kim | G02B 27/0101 |
| 2020/0064640 A1* | 2/2020 | Nagano | G02B 27/0101 |
| 2020/0201036 A1* | 6/2020 | Hong | G02B 30/00 |
| 2020/0348521 A1* | 11/2020 | Xiao | G02B 27/0172 |
| 2020/0355930 A1* | 11/2020 | Kasazumi | B60K 35/00 |
| 2020/0371368 A1* | 11/2020 | Liang | G06K 9/00671 |

FOREIGN PATENT DOCUMENTS

| | | |
|---|---|---|
| JP | H11-119147 A | 4/1999 |
| JP | 2014-142438 A | 8/2014 |
| JP | 2015-043012 A | 3/2015 |
| JP | 2017-21302 A | 1/2017 |

* cited by examiner

DISPLAY SYSTEM, CONTROL DEVICE, CONTROL METHOD, NON-TRANSITORY COMPUTER-READABLE MEDIUM, AND MOVABLE OBJECT

CROSS-REFERENCE TO RELATED APPLICATION

This application is based upon and claims the benefit of priority of Japanese Patent Application No. 2018-063909, filed on Mar. 29, 2018.

TECHNICAL FIELD

This disclosure relates generally to a display system, a control device, a control method, a non-transitory computer-readable medium, and a movable object, and more particularly relates to a display system configured or designed to project a virtual image, a control device with an adjustment unit to be used for the display system, a control method for the display system, a non-transitory computer-readable medium, and a movable object with the display system.

BACKGROUND ART

A document 1 (JPH06-87043 U) discloses a display device for vehicle. This display device for vehicle is configured to project a display image onto a windbreak glass with a combiner. The display device for vehicle is disposed below the windbreak glass, and includes a light emission display means having a light source, a lens that is a collimator, and a transmissive display body. The display device for vehicle moves, based on a vehicle speed, the light emission display means (e.g., the lens) forward or backward in a direction in which the light is emitted toward the combiner to change an image forming position of a virtual image to be displayed. The display device for vehicle therefore can change a visual distance between the virtual image and an observer (an eye-box) that observes the virtual image.

In case where a luminance of the light source is constant, if to change the visual distance the lens is merely moved forward or backward as the display device for vehicle disclosed by the document 1, the observer observing the virtual image may feel uncomfortable as if the luminance of the virtual image has changed. Thus, the display quality of the virtual image may be reduced and the visibility of the virtual image may be also reduced.

SUMMARY

The present disclosure is directed to a display system, a control device, a control method, a non-transitory computer-readable medium, and a movable object, which can suppress a reduction in display quality and visibility of a virtual image.

A display system according to an aspect of the present disclosure includes an image producing unit, a projection unit and an adjustment unit. The image producing unit has a display surface and is configured to produce an image on the display surface. The projection unit is configured to project a virtual image to a target space with an output light of the image producing unit. The virtual image corresponds to the image produced by the image producing unit. The display system is configured to change a visual distance between an eye-box and the virtual image. The adjustment unit is configured to adjust brightness of the virtual image according to the visual distance.

A control device according to an aspect of the present disclosure includes the adjustment unit to be used for the above-mentioned display system. The control device is provided separately from a display device including the image producing unit and the projection unit.

A control method according to an aspect of the present disclosure is a control method for a display system. The display system includes an image producing unit and a projection unit. The image producing unit has a display surface, and configured to produce an image on the display surface. The projection unit is configured to project a virtual image to a target space with an output light of the image producing unit. The virtual image corresponds to the image produced by the image producing unit. The display system is configured to change a visual distance between an eye-box and the virtual image. The control method includes adjusting brightness of the virtual image according to the visual distance.

A non-transitory computer-readable medium according to an aspect of the present disclosure has stored thereon a computer program which, upon execution by a computing system, causes the computing system to perform a control method for a display system. The display system includes: an image producing unit having a display surface, and configured to produce an image on the display surface; and a projection unit configured to project a virtual image to a target space with an output light of the image producing unit. The virtual image corresponds to the image produced by the image producing unit. The display system is configured to change a visual distance between an eye-box and the virtual image. The control method includes adjusting brightness of the virtual image according to the visual distance.

A movable object according to an aspect of the present disclosure includes: the above-mentioned display system; and a reflective member configured to reflect light emitted from the projection unit.

BRIEF DESCRIPTION OF THE DRAWINGS

The figures depict one or more implementations in accordance with the present disclosure, by way of example only, not by way of limitations. In the figures, like reference numerals refer to the same or similar elements.

DETAILED DESCRIPTION (1) Overview

An exemplary embodiment described below is merely one of various embodiments according to the present disclosure. The exemplary embodiment described below may be made various modifications based on designs or the like, as long as the object of the present disclosure can be achieved. Also since FIGS. 1 to 7 explained in the exemplary embodiment described below are schematic drawings, the ratios of sizes of elements shown in FIGS. 1 to 7 do not necessarily reflect ratios of real sizes thereof.

Figure 1:
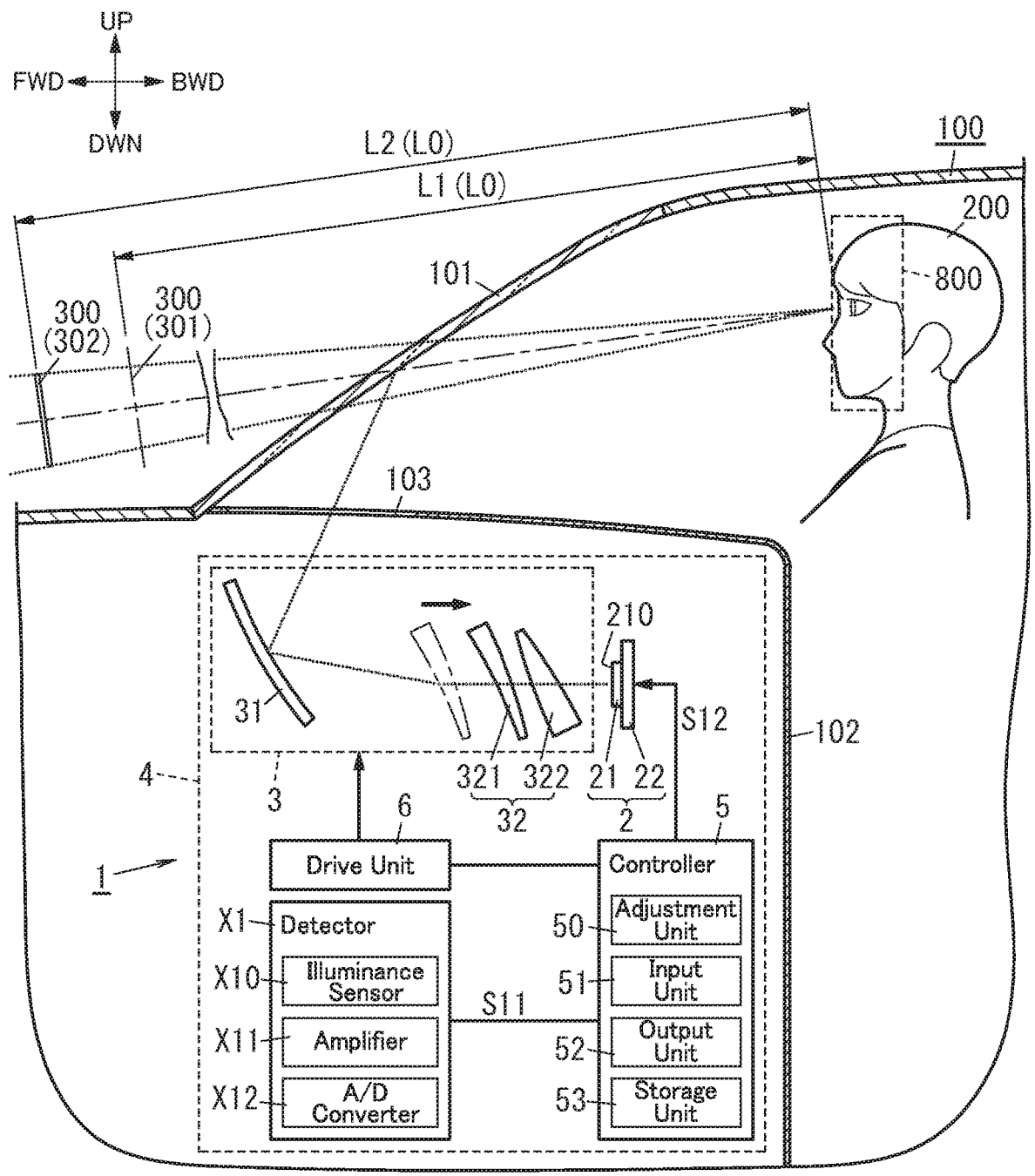
FIG. 1 is a schematic block drawing of a display system according to an exemplary embodiment.

A display system 1 of the present embodiment, as shown in FIG. 1, includes an image producing unit 2 and a projection unit 3. The image producing unit 2 has a display surface 210 and is configured to produce an image 7 (refer to FIG. 4B) on the display surface 210. The projection unit 3 is configured to project (form) a virtual image 300 to a target space 400 with an output light of the image producing unit 2. The virtual image 300 corresponds to the image 7 produced by the image producing unit 2. The "target space" mentioned herein is for example assumed to be a space including a region for forming the image of the display system 1.

Figure 2:
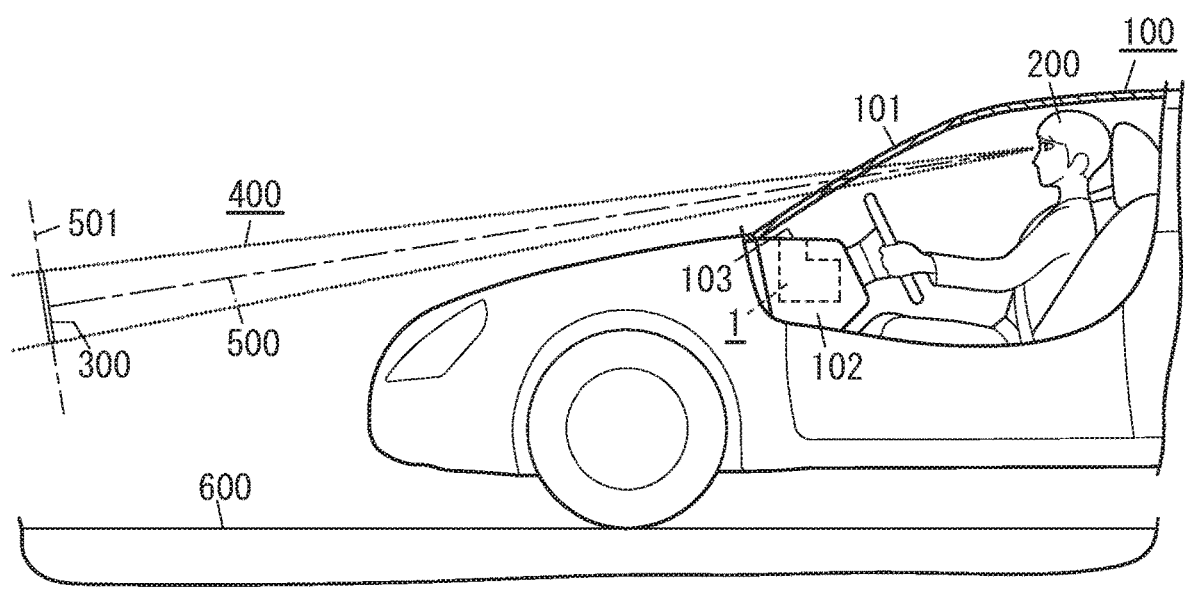
FIG. 2 is a schematic drawing of a movable object (automobile) with the display system.
Figure 3:
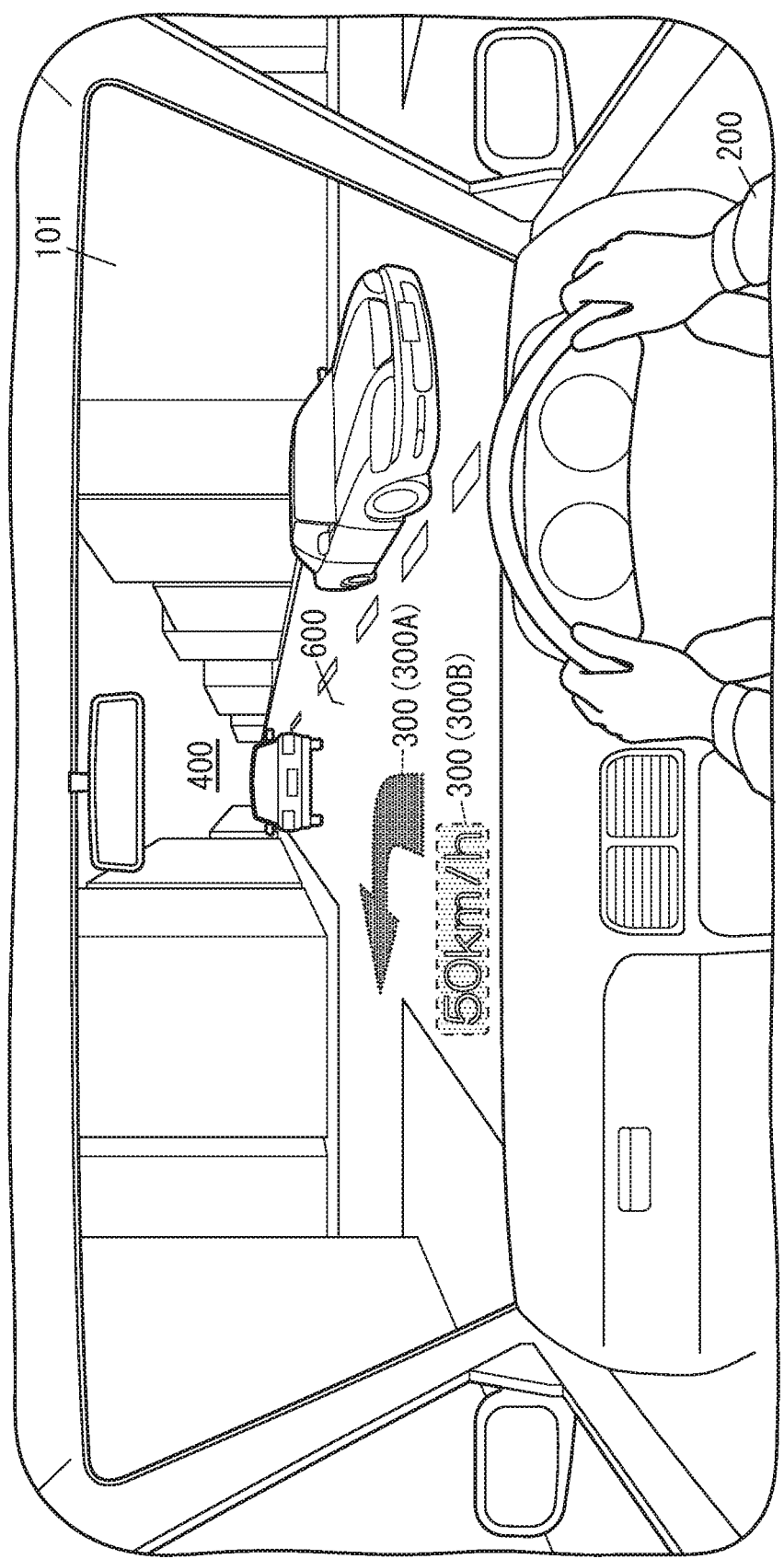
FIG. 3 is a schematic drawing showing a visual field of eyes of a user driving the movable object.

As shown in FIGS. 1 to 3, the display system 1 is assumed to be a Head-Up Display (HUD) to be used for an automobile 100 as a movable object. Accordingly, the target space 400 is a space outside the automobile 100 and mainly corresponds to a space in front of a windshield 101 (reflective member) of the automobile 100.

However the display system 1 is not necessarily applied to the Head-Up Display for the automobile 100, but may be also applied to the Head-Up Display for movable objects (such as a two-wheel vehicle, a train, an aircraft, a construction machine and a ship) other than the automobile 100. Alternatively the display system 1 is not limited to the Head-Up Display, but may be applied to an Augmented Reality (AR) display device that superimposes information on the real world.

As shown in FIG. 1, the display system 1 is configured to change a visual distance L0 (visual range) between an eye-box 800 and the virtual image 300. The eye-box 800 is a space region where eyes of an observer (user 200) that observes the virtual image 300 would be located.

Herein the display system 1 of the present embodiment further includes an adjustment unit 50 (refer to FIG. 1) configured to adjust brightness of the virtual image 300 according to the visual distance L0. As one example, the adjustment unit 50 is configured to change a luminance of the display surface 210 to adjust the brightness of the virtual image 300. The brightness of the virtual image 300 may be however adjusted by changing lightness of colors of contents in the image 7 (refer to a First Variation described later).

According to the present disclosure, in case where the visual distance L0 is changed, it is possible to more reduce a possibility that the observer (user 200) feels uncomfortable as if the luminance of the virtual image 300 has changed, compared with the case of the above Document 1 where the display device for vehicle merely moves the lens forward or backward. Thus, the present disclosure can suppress a reduction in display quality and visibility of the virtual image 300.

(2) Details (2.1) Whole Configuration

Hereinafter, the display system 1 of the present embodiment will be described in detail with reference to FIGS. 1 to 5. As shown in FIG. 1, the display system 1 includes a display device 4 and is applied to as one example the automobile 100 that is a movable object, as explained in the column of the above "(1) Overview". The display device 4 is the Head-Up Display to be used for the automobile 100, as one example.

Also hereinafter, as one example, the adjustment unit 50 explained in the column of the above "(1) Overview" is assumed to be provided in a controller 5 of the display device 4.

(2.2) Display Device

The display device 4 is disposed inside a vehicle cabin of the automobile 100 to project the image 7 (refer to FIG. 4B) to the windshield 101 of the automobile 100 from the downside. In the example of FIG. 2, the display device 4 is placed in a dashboard 102 below the windshield 101. As shown in FIG. 1, the display device 4 includes the image producing unit 2, the projection unit (optical system) 3, the controller 5, a drive unit 6 and a detector X1.

The image producing unit 2 is configured to output light to form the image 7. In the present embodiment, as one example, the image producing unit 2 includes a liquid crystal panel 21 (Liquid Crystal Display: LCD) and a light source device 22, as shown in FIG. 1. The liquid crystal panel 21 has in a front face thereof the display surface 210, and forms the image 7 on the display surface 210. The liquid crystal panel 21 is disposed in front of the light source device 22. The light source device 22 is used as a backlight for the liquid crystal panel 21. The light source device 22 is a so-called plane light source. The light source device 22 is a side-light type light source device with a solid-state light emitting element such as a light emitting diode or a laser diode. The light emitted by the light source device 22 passes through the liquid crystal panel 21 and is output from the image producing unit 2.

In the image producing unit 2, when the light source device 22 emits light while the image 7 is displayed on the liquid crystal panel 21, the light emitted forward by the light source device 22 passes through the liquid crystal panel 21, and is output forward from the front face of the liquid crystal panel 21. In this case, since the light output forward from the front face of the liquid crystal panel 21 is light that has reflected the image 7 displayed on the liquid crystal panel 21, it results in that light forming the image 7 is output as an "output light" from the image producing unit 2.

Herein a longitudinal direction of the liquid crystal panel 21 corresponds to a longitudinal direction of the image 7 to be projected, and a lateral direction of the liquid crystal panel 21 corresponds to a lateral direction of the image 7 to be projected. The longitudinal direction of the image 7 to be projected corresponds to a longitudinal direction of the virtual image 300 (refer to FIGS. 1 to 3) to be projected onto the target space 400, namely a direction along a vertical direction in a visual field of eyes of the user 200 (refer to FIG. 2). The lateral direction of the image 7 to be projected corresponds to a lateral direction of the virtual image 300 to be projected onto the target space 400, namely a direction along a horizontal direction in the visual field of eyes of the user 200.

The projection unit 3 is configured to reflect the output light of the image producing unit 2 to project the image 7. In the present embodiment, since the display device 4 is the Head-Up Display as above and projects the image 7 onto the windshield 101 (refer to FIG. 1) that is a reflective member, the projection unit 3 projects the image 7 with respect to an object configured by the windshield 101.

In the present embodiment, as one example, the projection unit 3 as shown in FIG. 1 includes a mirror 31 and a zoom lens 32 (lens group). The zoom lens 32 is disposed between the display surface 210 of the liquid crystal panel 21 and the mirror 31. The zoom lens 32 includes, for example, a drive lens 321 having a light diffusing action, and a fixed lens 322 having a light condensing action. The projection unit 3 is configured such that the fixed lens 322, the drive lens 321 and the mirror 31 are arranged in that order on an optical path of light output from the display surface 210 of the liquid crystal panel 21. Herein the zoom lens 32 is the lens group that includes two lenses, but the number of the lenses is not particularly limited.

The projection unit 3 firstly condenses the output light of the image producing unit 2 with the fixed lens 322, and then diffuses the output light with the drive lens 321 to be reflected by the mirror 31, thereby the reflected light being output toward the windshield 101. The mirror 31 is a concave mirror, as one example. To make the output light of the image producing unit 2 incident onto the mirror 31, the mirror 31 is disposed on the side opposite to the light source device 22, of the liquid crystal panel 21, namely, in front of the liquid crystal panel 21.

According to the configuration as above, the projection unit 3 properly modifies the size of the image 7 produced by the image producing unit 2 and projects the modified image as a projection image onto the windshield 101 that is an object, and the virtual image 300 is therefore projected (formed) onto the target space 400. The "virtual image" mentioned herein means that when the light rays output from the display device 4 are diffused by a reflective member such as the windshield 101, the image is formed with the diffused light rays as if a real object exists.

In the display device 4, the virtual image 300 in the target space 400 is formed onto a virtual screen 501 intersecting with an optical axis 500 of the display device 4, as shown in FIG. 2. In the present embodiment, the optical axis 500 is along a road surface 600 in front of the automobile 100, in the target space 400 (in front of the automobile 100). The virtual screen 501 where the virtual image 300 is formed is arranged substantially vertically with respect to the road surface 600. For example, in case where the road surface 600 is a horizontal plane, the virtual image 300 is displayed along a vertical plane.

Accordingly, the user 200 driving the automobile 100, as shown in FIG. 3, can see the virtual image 300 projected by the display device 4 with overlapping the virtual image 300 with a real space spreading in front of the automobile 100. Therefore, the display device 4 for example can display, as the virtual image 300, various driving assist information (such as vehicle speed information, navigation information, pedestrian information, preceding vehicle information, lane departure warning information, and vehicle condition information), thereby making the user 200 visually recognize it. In the example of FIG. 3, the virtual image 300 includes a first virtual image 300A and a second virtual image 300B. Details of the first virtual image 300A (hereinafter, referred to "contents") include an arrow (e.g., for guiding the left-hand turn), the present location or the like. Contents of the second virtual image 300B include the vehicle speed information, the drawing showing "50 km/h" as one example. Accordingly, the user 200 can visually obtain the driving assist information with only slightly shifting sight line while turning the user's eyes on the front of the windshield 101.

The controller 5 controls the image producing unit 2 (including the liquid crystal panel 21 and the light source device 22). Also the controller 5 controls the drive unit 6. The controller 5 for example includes a microcomputer mainly with a Central Processing Unit (CPU) and a memory. In other words, the controller 5 is realized by a computer (processor) including the CPU and the memory, and the computer, when the CPU executes a computer program stored in the memory, functions as the controller 5. The computer program is for example assumed to be stored in advance in the memory of the controller 5, but at least part of the computer program may be provided through a telecommunication network such as the Internet or a non-transitory storage medium such as a memory card.

The controller 5 controls the image producing unit 2 to produce the arbitrary image 7 on the display surface 210. That is, the controller 5 can allow the liquid crystal panel 21 to display (plot) arbitrary video contents by software processing, and accordingly the arbitrary image 7 can be produced on the display surface 210. For example upon projection of the virtual image 300 as in FIG. 3 (the first virtual image 300A and the second virtual image 300B) onto the target space 400, the controller 5 determines the contents of the first virtual image 300A (the arrow, the present location or the like) and the contents of the second virtual image 300B (the vehicle speed information). The controller 5 further determines where the image 7 should be displayed on the front surface of the liquid crystal panel 21, namely, the display surface 210. In short, the controller 5 can determine displaying the image 7 corresponding to the first virtual image 300A on an upper half region or a lower half region of the display surface 210. If the image 7 is changed a position on the display surface 210, the virtual image 300 also changes in a relative display position, depending on the position change of the image 7.

As shown in FIG. 1, the display system 1 of the present embodiment is configured to change the visual distance L0 between the eye-box 800 and the virtual image 300. More specifically the drive unit 6 moves an optical element included in the projection unit 3 to change the visual distance L0. That is, the drive unit 6 is configured to change a position of the optical element. In the present embodiment, as one example, the drive lens 321 is a target to be driven by the drive unit 6. Under control of the controller 5, the drive unit 6 moves the drive lens 321 to be closer to or more separated from the fixed lens 322, thereby can increasing or decreasing the visual distance L0 between the eye-box 800 and the virtual image 300. The drive unit 6 may include an electrically-driven actuator such as a motor. The drive unit 6 may be further configured to physically change a position or a direction of the display surface 210 of the liquid crystal panel 21, or turn the mirror 31 to change a direction thereof, although detail explanations thereof are omitted.

Figure 4A:
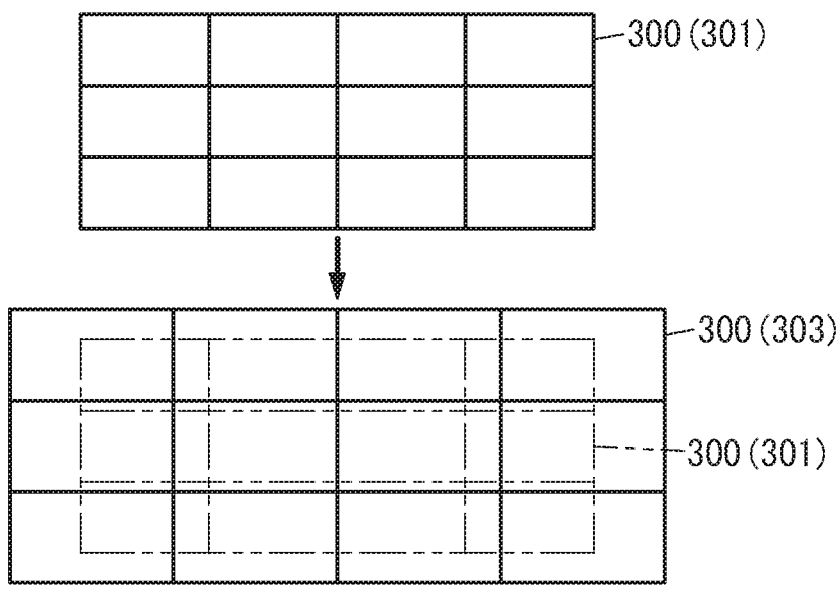
FIG. 4A is a drawing showing appearance of a virtual image in case of not adjusting a size of an image when changing a visual distance in the display system.

If the drive lens 321 is moved in a direction of shortening an interval between itself and the image producing unit 2, the visual distance L0 increases. This reason is that magnification of the zoom lens 32 becomes larger by shortening the interval. However, only if the interval is merely shortened, a display field angle (viewing angle) of the virtual image 300 when viewed from the user 200 also becomes larger, as shown in FIG. 4A. FIG. 4A schematically shows, by rectangular lattice shape, the virtual image 300 when viewed from the user 200, where a reference sign "301" represents the virtual image 300 before the change in the visual distance L0, and a reference sign "303" represents the virtual image 300 after the change in the visual distance L0. That is, if the size of the image 7 displayed on the image producing unit 2 is kept constant between before and after the movement of the drive lens 321, the size of the virtual image 300 visually obtained by the user 200 would be unwillingly changed. In the example of FIG. 4A, the size of the virtual image 300 is increased.

Figure 4B:
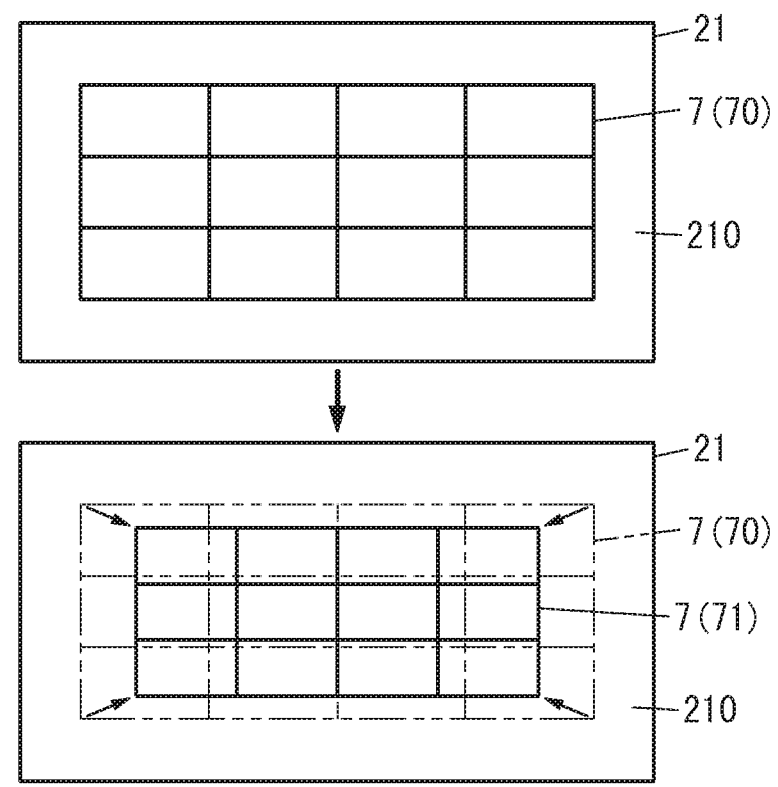
FIG. 4B is a drawing showing appearance of the virtual image in case of adjusting the size of the image when changing the visual distance in the display system.

To solve this problem, the controller 5 decreases the size of the image 7 to be displayed on the image producing unit 2 in accordance with the movement of the drive lens 321 in order to keep constant the display field angle between before and after the movement of the drive lens 321 performed for increasing the visual distance L0 (refer to FIG. 4B). FIG. 4B schematically shows, by rectangular lattice shape, the image 7 produced on the display surface 210 of the image producing unit 2, where a reference sign "70" represents the image 7 before change in the size thereof, and a reference sign "71" represents the image 7 after the change in the size thereof (downsized). The controller 5 determines: a driving quantity of the drive unit 6; and the size of the image 7. In this case, the driving quantity of the drive unit 6 is for example proportional to a variation in the size of the image 7 to be produced on the display surface 210. In this way when the display field angle is controlled to be constant between before and after the movement of the drive lens 321, it is possible to suppress a possibility that the user 200 viewing the virtual image 300 feels uncomfortable due to the increase in the display field angle of the virtual image 300 together with the increase in the visual distance L0 for example. Note that "constant" of "the display field angle is controlled to be constant" mentioned herein is not necessarily "strictly constant". The display field angle may be substantially constant within a prescribed range including an acceptable slight error.

Herein the size of the image 7 to be displayed on the display surface 210 of the image producing unit 2 means a size of an image that is displayed with pixels to be used for displaying the contents, of a plurality of pixels constituting the display surface 210.

The controller 5 of the present embodiment, as shown in FIG. 1, includes the adjustment unit 50 that is configured to adjust brightness of the virtual image 300 according to the change in the visual distance L0 performed by the drive unit 6. The adjustment unit 50 will be explained in more detail in the column of the following "(2.3) Adjustment unit".

The detector X1 is configured to detect an ambient light illuminance (e.g., a light illuminance in the target space 400 outside the automobile 100, the target space 400 including a region for forming the image of the display device 4), and transmit information on the detected light illuminance to the controller 5.

The detector X1, as shown in FIG. 1, includes an illuminance sensor X10, an amplifier X11, an A/D converter X12 and the like. The illuminance sensor X10 includes a photo Integrated Circuit (IC) detecting the light illuminance of the target space 400, for example, and is disposed near an opening 103 in the dashboard 102 of the automobile 100. The illuminance sensor X10 outputs, to the amplifier X11, an illuminance voltage (analog signal) corresponding to the light illuminance of the target space 400. The amplifier X11 amplifies the signal received from the illuminance sensor X10 and outputs it to the A/D converter X12. The A/D converter X12 converts the output signal of the amplifier X11 to a digital signal, and transmits it, as a value of the light illuminance (detection value), to the controller 5.

(2.3) Adjustment Unit

Hereinafter, the configuration of the adjustment unit 50 of the controller 5 will be mainly described in more detail. Explanations of the basic control processing regarding plotting of the video contents in the image producing unit 2 and driving of the drive unit 6 as described above may be appropriately omitted in this column.

As shown in FIG. 1, the controller 5 includes the adjustment unit 50, an input unit 51, an output unit 52 and a storage unit 53. The storage unit 53 may be the above-mentioned memory or another unit provided separately from the above-mentioned memory.

The controller 5 performs control of changing the visual distance L0 with the drive unit 6, by receiving an operation input from the user 200 through an operation unit (not shown), or automatic control in accordance with the video contents to be displayed. The adjustment unit 50 is configured to adjust the brightness of the virtual image 300 (i.e., execute adjustment processing) according to the change in the visual distance L0. In this embodiment, the adjustment unit 50 increases the brightness of the virtual image 300, as the visual distance L0 is increased. Also the adjustment unit 50 changes a luminance of the display surface 210 to adjust the brightness of the virtual image 300. In other words, the controller 5 changes, in accordance with the driving quantity of the drive unit 6, both of the size of the image 7 to be displayed on the liquid crystal panel 21 and the optical quantity of the light to be output from the liquid crystal panel 21.

The storage unit 53 is a data-rewritable memory, and more preferably a nonvolatile memory. For example, the storage unit 53 stores in advance therein: first data where the driving quantities and sizes of the image 7 are made associated with each other; and second data where the driving quantities and the optical quantities (target values) of the backlight (light source device 22) are made associated with each other. The first data is preferably data in which the driving quantity is proportional to the variation in the size of the image 7, as mentioned above. The second data is preferably data obtained by analyzing in advance an optical quantity distribution relating to the light source device 22 by a test and the like. In particular, light intensity (candela) of the light, emitted from the light source device 22 to the display surface 210, may have variations in some extent rather than be completely uniform on the whole area of the display surface 210. For example, the light intensity becomes larger, as it approaches a central area of the display surface 210. Thus, the virtual image 300 projected may be changed in a luminance, also depending on a display position of the image 7 on the display surface 210 (e.g., whether the display position is the central area, an upper area or a lower area, of the display surface 210, or the like). For this reason, the optical quantity distribution of the light source device 22 with respect to the area of the display surface 210 is one of parameters important for the adjustment processing to be performed by the adjustment unit 50 according to the change in the visual distance L0. Accordingly the second data preferably includes a plurality of respective optical quantities (target values) corresponding to a plurality of display positions (X-Y coordinate values) of the image 7 on the display surface 210, with respect to each driving quantity.

In particular, as described above, the controller 5 changes the size of the image 7 to be displayed on the image producing unit 2 in accordance with the movement of the drive lens 321 in order to keep constant the display field angle between before and after the movement of the drive lens 321 for increasing (or decreasing) the visual distance L0. However, when the size of the image 7 is for example downsized, it narrows the usage area to be used for displaying the image 7 on the display surface 210. Therefore, if, without the adjustment unit 50, the optical quantity of the light source device 22 is unchanged, it would result in reducing the luminance of the virtual image 300 viewed by the user 200.

On the other hand, the adjustment unit 50 generates a control signal based on the second data so that, even if the visual distance L0 is changed, the luminance of the virtual image 300 is kept substantially constant, that is, the luminance of the virtual image 300 falls within a prescribed target range. The controller 5 outputs the control signal to the image producing unit 2 to adjust the brightness of the virtual image 300. Accordingly, even if the size of the image 7 is changed for keeping constant the display field angle of the virtual image 300, the display system 1 can suppress the virtual image 300 from being blurred and dimly seen due to the change in the brightness of the virtual image 300 viewed from the user 200. The display system 1 therefore can suppress a reduction in display quality and visibility of the virtual image 300.

The adjustment unit 50 preferably controls the optical quantity of the light source device 22 so as to be gradually increased exponentially (as drawing a curve), rather than proportionally, from the current optical quantity to the target value of the optical quantity determined based on the second data.

Also the adjustment unit 50 periodically receives the detection value from the detector X1, regardless of the presence or absence of the change in the visual distance L0, and adjusts the luminance of the virtual image 300 based on the detection value. For example when the ambient light illuminance is changed due to day time or night time, or that the automobile 100 has entered a tunnel, there is a possibility that the visibility of the virtual image 300 may be reduced. So, the storage unit 53 stores in advance therein data where detection values and the optical quantities (target values) of the light source device 22 are made associated with each other. To prevent the reduction in the visibility, the adjustment unit 50 controls, based on the data in the storage unit 53, the light source device 22 so that the current optical quantity substantially matches with the target value of the optical quantity corresponding to the detection value received from the detector X1 to adjust the luminance of the virtual image 300. The adjustment unit 50 further controls the light source device 22 to adjust the luminance of the virtual image 300, when receiving a prescribed operation input from the user 200 through the operation unit (not shown) in addition to such the automatic luminance adjustment.

The input unit 51 is electrically connected to an output terminal of the A/D converter X12 of the detector X1 with a signal line S11 (refer to FIG. 1). The input unit 51 is configured to periodically receive the detection value of the light illuminance from the detector X1.

The output unit 52 is electrically connected to the image producing unit 2 with a signal line S12 (refer to FIG. 1). The output unit 52 is configured to output the control signal generated by the adjustment unit 50 to the image producing unit 2. When receiving the control signal, the image producing unit 2 allows a lighting circuit, which performs lighting control for the light source device 22 (light source), to change the light output level of the light source so that the current optical quantity matches with the optical quantity indicated in the control signal.

When changing the visual distance L0, the adjustment unit 50 preferably adjusts the brightness of the virtual image 300 also in consideration of the detection value received from the detector X1. For example, the second data may include respective kinds of data tables that are set for the day time, the night time and the tunnel or the like. The adjustment unit 50 may select a kind of data table set for the night time, when for example determining that it is the night time now based on the received detection value, and then determine, with reference to the kind of data table, the optical quantity (target value) of the light source device 22 corresponding to the driving quantity of the drive unit 6.

The controller 5 is electrically connected to an Electronic Control Unit (ECU) installed in the automobile 100, and configured to transmit to and receive various electrical signals to and from the ECU.

(2.4) Operation of Adjustment Unit

Figure 5:
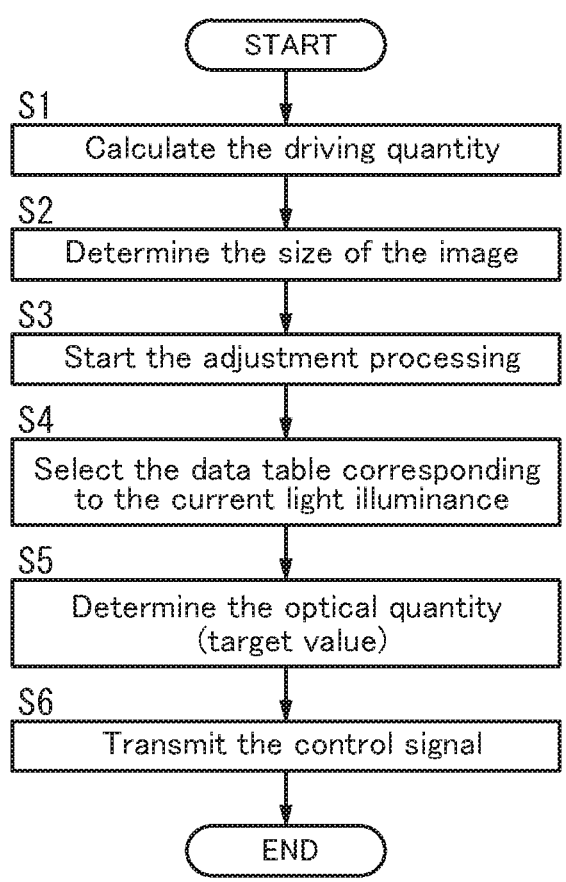
FIG. 5 is a flowchart for explaining operation of an adjustment unit of the display system.

Hereinafter, operation of the adjustment unit 50 will be explained with reference to a flowchart of FIG. 5. Herein as one example, it is assumed that the visual distance L0 is increased from a first distance L1 to a second distance L2, as shown in FIG. 1.

First, when determining to carry out change of the visual distance L0, the controller 5 determines (calculates) the driving quantity of the drive unit 6 (herein a displacement quantity of the drive lens 321) corresponding to a difference between the first distance L1 and the second distance L2 (Step S1). When the driving quantity is determined, the controller 5 refers to the first data in the storage unit 53 and determines a reduced size of the image 7 corresponding to the driving quantity (Step S2). Then the controller 5 starts an execution of the adjustment processing by the adjustment unit 50 (Step S3).

The adjustment unit 50 refers to the second data in the storage unit 53 and then selects, using the last detection value received from the detector X1, the kind of data table corresponding to the current light illuminance (Step S4). The adjustment unit 50 determines, based on the selected kind of data table, the driving quantity and the optical quantity (target value) of the light source device 22 corresponding to the display position of the image 7 on the display surface 210 (Step S5).

When the displacement quantity of the drive lens 321, the size of the image 7 and the target value of the optical quantity are determined, the controller 5 transmits the control signal including those information to the drive unit 6 and the image producing unit 2 (Step S6). More specifically the controller 5 controls and allows the drive unit 6 to move the drive lens 321 closer to the fixed lens 322 by the determined displacement quantity (refer to an arrow in FIG. 1). Furthermore the controller 5 allows the image producing unit 2 to reduce the size of the image 7 at the substantially same timing as the control for the drive unit 6. In addition, the controller 5 allows the image producing unit 2 to gradually increase the current optical quantity to the target value, of the light source device 22.

As a result, the virtual image 300(301) at a position separated by the first distance L1 from the eye-box 800 is moved farther away from the eye-box 800, thereby reaching a position separated by the second distance L2 from the eye-box 800 (refer to the virtual image 300(302) in FIG. 1). In the present embodiment, even if the visual distance L0 of the virtual image 300 is changed, the adjustment unit 50 can suppress, by the adjustment processing, the reduction in the display quality and the visibility of the virtual image 300.

(3) Variation

Next, variations of the exemplary embodiment described above will be enumerated one after another. Hereinafter, the exemplary embodiment described above may be referred to as a "basic example". Optionally any of the variations below may be adopted in combination with the above basic example and/or the other variation as appropriate.

(3.1) First Variation

In the basic example, the adjustment unit 50 is configured to change the luminance of the display surface 210 to adjust the brightness of the virtual image 300. However, the adjustment unit 50 is not limited to such the configuration, but may be configured to change lightness of colors (color tone) of the contents in the image 7 to adjust the brightness of the virtual image 300. Optionally the adjustment unit 50 may be configured to change properly both of the luminance of the display surface 210 and the lightness of colors of the contents to adjust the brightness of the virtual image 300.

The liquid crystal panel 21 may be for example an LCD capable of displaying full colors.

More specifically the adjustment unit 50 changes the lightness of colors in accordance with the contents included in the image 7. For example when explained using FIG. 3, there are cases where the display system 1 may change only the visual distance L0 of the first virtual image 300A including the contents as the arrow without changing the visual distance L0 of the second virtual image 300B including the contents as the vehicle speed information. It is assumed that, while the visual distance L0 is set to the first distance L1, the second virtual image 300B has a display color of light gray close to white. When the visual distance L0 is changed to the second distance L2, the adjustment unit 50 may reduce the lightness of colors of the second virtual image 300B so as to gradually increase a ratio of black color. Since the lightness of colors is reduced according to the increase in the visual distance L0, the display system 1 can suppress the first virtual image 300A from being blurred and dimly seen.

The adjustment unit 50 may determine a target value for the lightness of colors based on only the display color of the first virtual image 300A, or based on a correlation with the display color of the second virtual image 300B, which has been displayed near the first virtual image 300A, and the visual distance L0 of which is unchanged.

Alternatively the adjustment unit 50 may change the contents themselves (display information) of the virtual image 300, when changing the visual distance L0. For example, the adjustment unit 50 may display, while the visual distance L0 is set to the first distance L1, the virtual image 300 including both contents of the vehicle speed information and the navigation information, but, when it is changed to the second distance L2, the virtual image 300 including only the contents of the vehicle speed information with erasing the contents of the navigation information. In this case, the adjustment unit 50 may also change the lightness of colors together with the change in the contents themselves.

(3.2) Second Variation

In the basic example, when changing the visual distance L0, the controller 5 changes the size of the image 7 to keep constant the display field angle of the virtual image 300 between before and after the movement of the drive lens 321. However, the controller 5 is not limited to such the configuration, but the display field angle of the virtual image 300 may be changed between before and after the movement of the drive lens 321.

For example when increasing the visual distance L0, the adjustment unit 50 may change the size of the image 7 to make the display field angle of the virtual image 300 smaller, contrary to the increase of the visual distance L0. The adjustment unit 50 may properly determine, based on the contents in the image 7, whether or not the display field angle of the virtual image 300 should be kept constant.

(3.3) Third Variation

Figure 6:
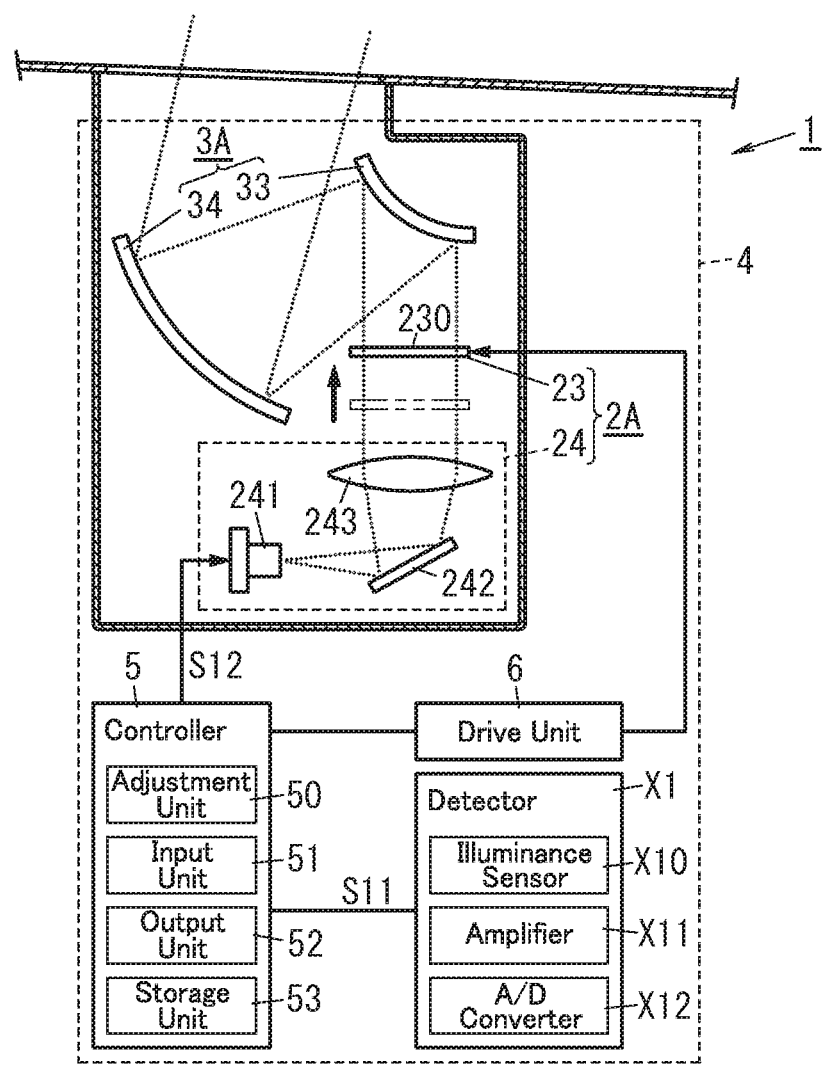
FIG. 6 is a schematic block drawing of a Third Variation of the display system.

In the basic example, the image producing unit 2 includes the liquid crystal panel 21 (LCD) with the backlight, but is not limited to the configuration including the LCD. As shown in FIG. 6, the display device 4 may include an image producing unit 2A (Third Variation). The image producing unit 2A may have an optical diffusion transmissive type of screen 23 and an irradiation unit 24 that irradiates the screen 23 from a back side thereof with light.

The irradiation unit 24 is a scanning-type optical irradiation unit, and irradiates the screen 23 with light beam. Accordingly, the image 7 (refer to FIG. 4B) is plotted on a display surface 230 that is a front surface or back surface of the screen 23 (herein the front surface) by the light beam output from the irradiation unit 24. The virtual image 300 is therefore formed in the target space 400 by the light beam passing through the screen 23.

The irradiation unit 24 includes a light source 241 outputting laser light, a scanning unit 242 performing scanning with the laser light of the light source 241, and a lens 243. The light source 241 includes a laser module outputting the laser light. The scanning unit 242 performs the scanning with the laser light of the light source 241, thereby the light beam for scanning the display surface 230 being radiated to the screen 23. Herein the scanning unit 242 performs so-called Raster scan of scanning two-dimensionally with respect to a longitudinal direction and a lateral direction of the display surface 230. That is, the scanning unit 242 forms the two-dimensional image by scanning with a beam spot formed on the display surface 230. The scanning unit 242 includes, for example, a fine scanning mirror using Micro Electro Mechanical Systems (MEMS). That is, the scanning unit 242 includes an optical element (mirror part) that reflects the laser light, and turns the optical element to reflect the laser light of the light source 241 in a direction in accordance with a turning angle (deflection angle) of the optical element. Accordingly, the scanning unit 242 scans with the laser light of the light source 241. The scanning unit 242 makes the optical element turn around two axes (orthogonal to each other) to realize the Raster scan of scanning two-dimensionally with the laser light.

The display device 4 of the present variation includes a projection unit 3A with a first mirror 33 and a second mirror 34. The first mirror 33 and the second mirror 34 are arranged in that order on an optical path of the light beam output from the image producing unit 2A. The first mirror 33 reflects the output light of the image producing unit 2A toward the second mirror 34. The second mirror 34 reflects the output light reflected by the first mirror 33, of the image producing unit 2A, toward the windshield 101. The first mirror 33 is a convex mirror and the second mirror 34 is a concave mirror.

In the present variation, the screen 23 is a target to be driven by the drive unit 6. To change the visual distance L0, the controller 5 controls the drive unit 6 to drive the screen 23. Under the control of the controller 5, the drive unit 6 moves the screen 23 to be closer to or more separated from the lens 243, thereby can increasing or decreasing the visual distance L0 between the eye-box 800 and the virtual image 300.

The adjustment unit 50 of the controller 5 is configured to adjust the brightness of the virtual image 300 (i.e., execute the adjustment processing) according to the change in the visual distance L0. The controller 5 changes, in accordance with the driving quantity of the drive unit 6, both of the size of the image 7 to be displayed on the screen 23 and the optical quantity of the light to be output from the light source 241.

Also in the present variation, the display system 1 can suppress the reduction in the display quality and the visibility of the virtual image 300 to be generated due to the change of the visual distance L0.

(3.4) Fourth Variation

Figure 7:
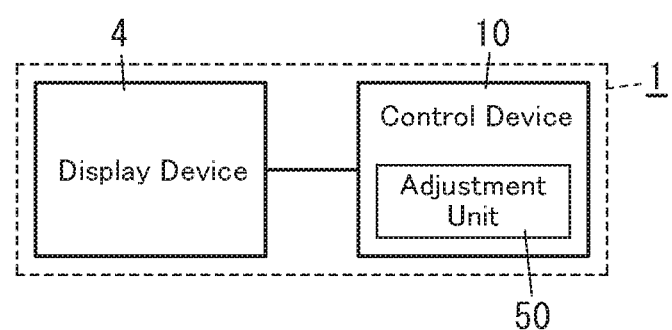
FIG. 7 is a schematic block drawing of a display system with a control device according to an exemplary embodiment.

In the basic example, the adjustment unit 50 is provided in the controller 5 of the display device 4. Optionally the adjustment unit 50 may be however provided separately from the display device 4. For example as shown in FIG. 7, a control device 10 with the adjustment unit 50 may be provided separately from a display device 4.

The display system 1 includes the display device 4 and the control device 10. The display device 4 includes an image producing unit 2, a projection unit 3, a drive unit 6, a controller 5 (having control functions other than a function of the adjustment unit 50), a detector X1, and a communication interface (capable of transmitting and receiving signals to and from the control device 10). The controller 5 of the display device 4 controls, when receiving from the control device 10 a control signal for adjusting the luminance of the virtual image 300, the image producing unit 2 in accordance with the control signal. In this case, for example, the control device 10 may be an Electronic Control Unit (ECU) installed in the automobile 100, and the function of the adjustment unit 50 may be provided in the ECU.

(3.5) Other Variations

For the image producing unit 2, an organic light emitting diode (electroluminescence) panel may be used, for example.

Upon the change of the visual distance L0, the target to be driven by the drive unit 6 may be for example a mirror or the liquid crystal panel 21, instead of the drive lens 321 in the basic example or the screen 23 in the Third Variation.

Also, the same function as that of the controller 5 (mainly the adjustment unit 50) in the present disclosure may be implemented as a computer program, or a non-transitory storage medium that stores the computer program thereon, for example. The agent that implements the adjustment unit 50 includes a computer system. The computer system includes, as principal hardware components, a processor and a memory. The function of the agent that implements the adjustment unit 50 is performed by making the processor execute the computer program stored in the memory of the computer system. The computer program may be stored in advance in the memory of the computer system. Alternatively, the computer program may also be downloaded through a telecommunications line or be distributed after having been stored in some computer-readable non-transitory storage medium. Examples of the computer-readable non-transitory storage media include a memory card, an optical disc, and a hard disk drive. The processor of the computer system is made up of a single or a plurality of electronic circuits including a semiconductor integrated circuit (IC) or a largescale integrated circuit (LSI). Those electronic circuits may be integrated together on a single chip or distributed on multiple chips without limitation. Those multiple chips may be integrated together in a single device or distributed in multiple devices without limitation.

Also the controller 5 in the basic example is implemented in a single device, but not limited to such the configuration. For example, at least some functions of the controller 5 may be distributed in a plurality of devices. Similarly at least some functions of the illuminance sensor X10, the amplifier X11 and the A/D converter X12 of the detector X1 may be distributed in a plurality of devices. Furthermore, at least some functions of the controller 5 may be implemented as a cloud computing system as well.

(4) Resume

As apparent from the foregoing description, a display system (1) according to a first aspect includes an image producing unit (2, 2A), a projection unit (3, 3A) and an adjustment unit (50). The image producing unit (2, 2A) has a display surface (210, 230) and is configured to produce an image (7) on the display surface (210, 230). The projection unit (3, 3A) is configured to project a virtual image (300) to a target space (400) with an output light of the image producing unit (2, 2A). The virtual image (300) corresponds to the image (7) produced by the image producing unit (2, 2A). The display system (1) is configured to change a visual distance (L0) between an eye-box (800) and the virtual image (300). The adjustment unit (50) is configured to adjust brightness of the virtual image (300) according to the visual distance (L0). According to the first aspect, the display system (1) can suppress a reduction in display quality and visibility of the virtual image (300).

In a display system (1) according to a second aspect, which may be implemented in conjunction with the first aspect, the adjustment unit (50) is preferably further configured to adjust the brightness of the virtual image (300) according to an ambient light illuminance. According to the second aspect, the display system (1) can more suppress the reduction in the display quality and visibility of the virtual image (300).

In a display system (1) according to a third aspect, which may be implemented in conjunction with the first aspect or the second aspect, the adjustment unit (50) is preferably configured to change a luminance of the display surface (210, 230) to adjust the brightness of the virtual image (300). According to the third aspect, the display system (1) can more suppress, with a simple constitution, the reduction in the display quality and visibility of the virtual image (300).

In a display system (1) according to a fourth aspect, which may be implemented in conjunction with any one of the first to third aspects, the adjustment unit (50) is preferably configured to change lightness of colors of contents in the image (7) produced by the image producing unit (2, 2A) to adjust the brightness of the virtual image (300). According to the fourth aspect, the display system (1) can more suppress, with a simple constitution, the reduction in the display quality and visibility of the virtual image (300).

In a display system (1) according to a fifth aspect, which may be implemented in conjunction with any one of the first to fourth aspects, the adjustment unit (50) is preferably configured to increase the brightness of the virtual image (300), as the visual distance (L0) is increased. According to the fifth aspect, the display system (1) can suppress the reduction in the display quality and visibility of the virtual image (300) (e.g., the virtual image 300 is blurred and dimly seen) due to the increase in the visual distance (L0).

In a display system (1) according to a sixth aspect, which may be implemented in conjunction with any one of the first to fifth aspects, a display field angle of the virtual image (300) projected by the projection unit (3, 3A) is preferably constant, regardless of a change in the visual distance (L0). According to the sixth aspect, the display system (1) can reduce occurrence of a situation that the an observer that observes the virtual image (300) feels uncomfortable due to the increase in the display field angle of the virtual image (300) together with the increase in the visual distance (L0) for example. Note that "constant" mentioned herein is not necessarily "strictly constant". The display field angle may be substantially constant within a prescribed range including an acceptable slight error.

In a display system (1) according to a seventh aspect, which may be implemented in conjunction with the sixth aspect, the adjustment unit (50) is preferably configured to adjust the brightness of the virtual image (300) according to the visual distance (L0) so as to make the brightness of the virtual image (300) fall within a prescribed target range. According to the seventh aspect, the display system (1) can suppress the brightness of the virtual image (300) viewed from the observer from changing due to that the size of the image (7) is changed to keep constant the display field angle of the virtual image (300), for example.

In a display system (1) according to an eighth aspect, which may be implemented in conjunction with any one of the first to seventh aspects, the projection unit (3) preferably includes a zoom lens (32) that is an optical element and allows the output light to pass therethrough. The projection unit (3) is preferably configured to modify a location of the zoom lens (32) to change the visual distance (L0). According to the eighth aspect, the display system (1) can realize the change of the visual distance (L0) with a simple constitution.

In a display system (1) according to a ninth aspect, which may be implemented in conjunction with any one of the first to eighth aspects, the eye-box (800) is preferably a space region where eyes of an observer that observes the virtual image (300) are located.

In a display system (1) according to a tenth aspect, which may be implemented in conjunction with any one of the first to ninth aspects, the display system (1) is preferably applied to a movable object (e.g., automobile 100). The target space (400) is a space in front of a windshield (101) of the movable object.

In a display system (1) according to an eleventh aspect, which may be implemented in conjunction with any one of the first to tenth aspects, the adjustment unit (50) is preferably configured to change display information of contents in the image (7) produced by the image producing unit (2) to adjust the brightness of the virtual image (300).

In a display system (1) according to a twelfth aspect, which may be implemented in conjunction with any one of the first to eleventh aspects, the image producing unit (2) preferably includes: a liquid crystal panel (21), a front face of which constitutes the display surface (210); and a light source device (22) serving as a backlight for the liquid crystal panel (21). According to the twelfth aspect, the display system (1) with the liquid crystal panel (21) can suppress the reduction in the display quality and visibility of the virtual image (300).

A control device (10) according to a thirteenth aspect includes the adjustment unit (50) to be used for the display system (1) of any one of the first to twelfth aspects. The control device (10) is provided separately from a display device (4) including the image producing unit (2, 2A) and the projection unit (3, 3A). According to the thirteenth aspect, it is possible to provide the control device (10), which can suppress the reduction in the display quality and visibility of the virtual image (300).

A control method according to a fourteenth aspect is a control method for a display system (1). The display system (1) includes an image producing unit (2, 2A) and a projection unit (3, 3A). The image producing unit (2, 2A) has a display surface (210, 230) and is configured to produce an image (7) on the display surface (210, 230). The projection unit (3, 3A) is configured to project a virtual image (300) to a target space (400) with an output light of the image producing unit (2, 2A). The virtual image (300) corresponds to the image (7) produced by the image producing unit (2, 2A). The display system (1) is configured to change a visual distance (L0) between an eye-box (800) and the virtual image (300). The control method includes adjusting brightness of the virtual image (300) according to the visual distance (L0). According to the fourteenth aspect, it is possible to provide the control method, which can suppress the reduction in the display quality and visibility of the virtual image (300).

A computer program according to a fifteenth aspect causes a computing system to perform the control method for the display system (1) of the fourteenth aspect. According to the fifteenth aspect, it is possible to provide a function, which can suppress the reduction in the display quality and visibility of the virtual image (300).

A non-transitory computer-readable medium according to a sixteenth aspect has stored thereon a computer program which, upon execution by a computing system, causes the computing system to perform a control method for a display system (1). The display system (1) includes an image producing unit (2, 2A) and a projection unit (3, 3A). The image producing unit (2, 2A) has a display surface (210, 230) and is configured to produce an image (7) on the display surface (210, 230). The projection unit (3, 3A) is configured to project a virtual image (300) to a target space (400) with an output light of the image producing unit (2, 2A). The virtual image (300) corresponds to the image (7) produced by the image producing unit (2, 2A). The display system (1) is configured to change a visual distance (L0) between an eye-box (800) and the virtual image (300). The control method includes adjusting brightness of the virtual image (300) according to the visual distance (L0).

A movable object (e.g., automobile 100) according to a seventeenth aspect includes the display system (1) of any one of the first to twelfth aspects and a reflective member (e.g., windshield 101) configured to reflect light emitted from the projection unit (3, 3A). According to the seventeenth aspect, it is possible to provide the movable object, which can suppress the reduction in the display quality and visibility of the virtual image (300).

Since the configurations of the two to twelfth aspects are not essential for the display system (1), any of the configurations may be appropriately omitted.

While various embodiments have been described herein above, it is to be appreciated that various changes in form and detail may be made without departing from the spirit and scope of the present disclosure presently or hereafter claimed.

The entire contents of Japanese Patent Application No. 2018-063909 mentioned above are incorporated by reference.

The invention claimed is:

1. A display system, comprising:
   an image producing unit having a display surface, and configured to produce an image on the display surface;
   a projection unit configured to project a virtual image to a target space with an output light of the image producing unit, the projection unit including a zoom lens, the virtual image corresponding to the image produced by the image producing unit, and the display system being configured to change a visual distance between an eye-box and the virtual image,
   wherein even when the visual distance is changed by changing a position of the zoom lens, a size of the image displayed on the image producing unit is changed so that a display field angle of the virtual image projected by the projection unit is constant, regardless of a change in the visual distance; and
   an adjustment unit configured to adjust brightness of the virtual image according to the visual distance so that the brightness of the virtual image fall within a prescribed target range, when the size of the image is changed so that the display field angle of the virtual image is constant according to the visual distance being changed by changing the position of the zoom lens.

2. The display system of claim 1, wherein
   the adjustment unit is further configured to adjust the brightness of the virtual image according to an ambient light illuminance.

3. The display system of claim 1, wherein
the adjustment unit is configured to change a luminance of the display surface to adjust the brightness of the virtual image.

4. The display system of claim 2, wherein
the adjustment unit is configured to change a luminance of the display surface to adjust the brightness of the virtual image.

5. The display system of claim 1, wherein
the adjustment unit is configured to change lightness of colors of contents in the image produced by the image producing unit to adjust the brightness of the virtual image.

6. The display system of claim 2, wherein
the adjustment unit is configured to change lightness of colors of contents in the image produced by the image producing unit to adjust the brightness of the virtual image.

7. The display system of claim 3, wherein
the adjustment unit is configured to change lightness of colors of contents in the image produced by the image producing unit to adjust the brightness of the virtual image.

8. The display system of claim 4, wherein
the adjustment unit is configured to change lightness of colors of contents in the image produced by the image producing unit to adjust the brightness of the virtual image.

9. The display system of claim 1, wherein
the adjustment unit is configured to increase the brightness of the virtual image, as the visual distance is increased.

10. The display system of claim 1, wherein
the eye-box is a space region where eyes of an observer that observes the virtual image are located.

11. The display system of claim 1, wherein
the display system is applied to a movable object, and
the target space is a space in front of a windshield of the movable object.

12. The display system of claim 1, wherein
the adjustment unit is configured to change display information of contents in the image produced by the image producing unit to adjust the brightness of the virtual image.

13. The display system of claim 1, wherein
the image producing unit includes:
a liquid crystal panel, a front face of which constitutes the display surface; and
a light source device serving as a backlight for the liquid crystal panel.

14. A control device, comprising the adjustment unit to be used for the display system of claim 1,
the control device is provided separately from a display device including the image producing unit and the projection unit.

15. A movable object comprising:
the display system of claim 1; and
a reflective member configured to reflect light emitted from the projection unit.

16. The display system of claim 1, wherein
the adjustment unit is configured to change lightness of colors of contents in the image produced by the image producing unit according to the contents to adjust the brightness of the virtual image.

17. The display system of claim 16, wherein
the contents include a first content and a second content, and
the adjustment unit changes lightness of colors only for content whose visual distance is changed.

18. A control method for a display system, the display system comprising:
an image producing unit having a display surface, and configured to produce an image on the display surface; and a projection unit configured to project a virtual image to a target space with an output light of the image producing unit, the projection unit including a zoom lens, the virtual image corresponding to the image produced by the image producing unit, and the display system being configured to change a visual distance between an eye-box and the virtual image, wherein even when the visual distance is changed by changing a position of the zoom lens, a size of the image displayed on the image producing unit is changed so that a display field angle of the virtual image projected by the projection unit is constant, regardless of a change in the visual distance,
the control method comprising adjusting brightness of the virtual image according to the visual distance so that the brightness of the virtual image fall within a prescribed target range, when the size of the image is changed so that the display field angle of the virtual image is constant according to the visual distance being changed by changing the position of the zoom lens.

19. A non-transitory computer-readable medium having stored thereon a computer program which, upon execution by a computing system, causes the computing system to perform a control method for a display system,
the display system comprising: an image producing unit having a display surface, and configured to produce an image on the display surface; and a projection unit configured to project a virtual image to a target space with an output light of the image producing unit, the projection unit including a zoom lens, the virtual image corresponding to the image produced by the image producing unit, and the display system being configured to change a visual distance between an eye-box and the virtual image, wherein even when the visual distance is changed by changing a position of the zoom lens, a size of the image displayed on the image producing unit is changed so that a display field angle of the virtual image projected by the projection unit is constant, regardless of a change in the visual distance,
the control method comprising adjusting brightness of the virtual image according to the visual distance so that the brightness of the virtual image fall within a prescribed target range, when the size of the image is changed so that the display field angle of the virtual image is constant according to the visual distance being changed by changing the position of the zoom lens.

* * * * *